(12) United States Patent
Allesø et al.

(10) Patent No.: US 11,578,923 B2
(45) Date of Patent: Feb. 14, 2023

(54) HEAT EXCHANGER COMPRISING FLUID TUBES HAVING A FIRST AND A SECOND INNER WALL

(71) Applicant: NISSENS COOLING SOLUTIONS A/S, Horsens (DK)

(72) Inventors: Anders Allesø, Horsens (DK); Jonas Bachmann, Horsens (DK); Jan Ostenfeldt Jensen, Horsens (DK)

(73) Assignee: Nissens Cooling Solutions A/S, Horsens (DK)

( * ) Notice: Subject to any disclaimer, the term of this patent is extended or adjusted under 35 U.S.C. 154(b) by 93 days.

(21) Appl. No.: 16/627,911

(22) PCT Filed: Jul. 13, 2018

(86) PCT No.: PCT/EP2018/069117
§ 371 (c)(1),
(2) Date: Dec. 31, 2019

(87) PCT Pub. No.: WO2019/012122
PCT Pub. Date: Jan. 17, 2019

(65) Prior Publication Data
US 2020/0132382 A1 Apr. 30, 2020

(30) Foreign Application Priority Data
Jul. 14, 2017 (EP) .................................. 17181358

(51) Int. Cl.
*F28D 1/053* (2006.01)
*F28F 1/02* (2006.01)

(52) U.S. Cl.
CPC .......... *F28D 1/05391* (2013.01); *F28F 1/022* (2013.01)

(58) Field of Classification Search
CPC ............... F28D 1/05391; F28D 1/0535; F28D 1/05383; F28F 1/022; F28F 1/003; F28F 1/02
(Continued)

(56) References Cited

U.S. PATENT DOCUMENTS 4,974,670 A * 12/1990 Noguchi ............... F25B 39/024
165/DIG. 466
5,318,114 A * 6/1994 Sasaki .................... F28F 1/022
165/176
(Continued)

FOREIGN PATENT DOCUMENTS

CN 1410738 A 4/2003
CN 101466993 A 6/2004
(Continued)

OTHER PUBLICATIONS

Notification of the First Office Action dated Jan. 6, 2021 in Chinese Application No. 201880044469.1, with English translation, 18 pages.
(Continued)

*Primary Examiner* — Tho V Duong
*Assistant Examiner* — Raheena R Malik
(74) *Attorney, Agent, or Firm* — Nixon & Vanderhye P.C.

(57) ABSTRACT

A heat exchanger comprising at least one fluid tube configured to extend substantially orthogonally to a wind direction, the fluid tube having a first wall and a second wall, and the fluid tube comprising: a first tube section and a second tube section each extending along the fluid tube, arranged such that each tube section is in fluid communication with a pair of manifolds and configured to contain a cooling fluid, wherein the first tube section is formed by the first wall, the second wall, a first outer wall and a first inner wall and the second tube section is formed by the first wall, the second
(Continued)

Figure 1:
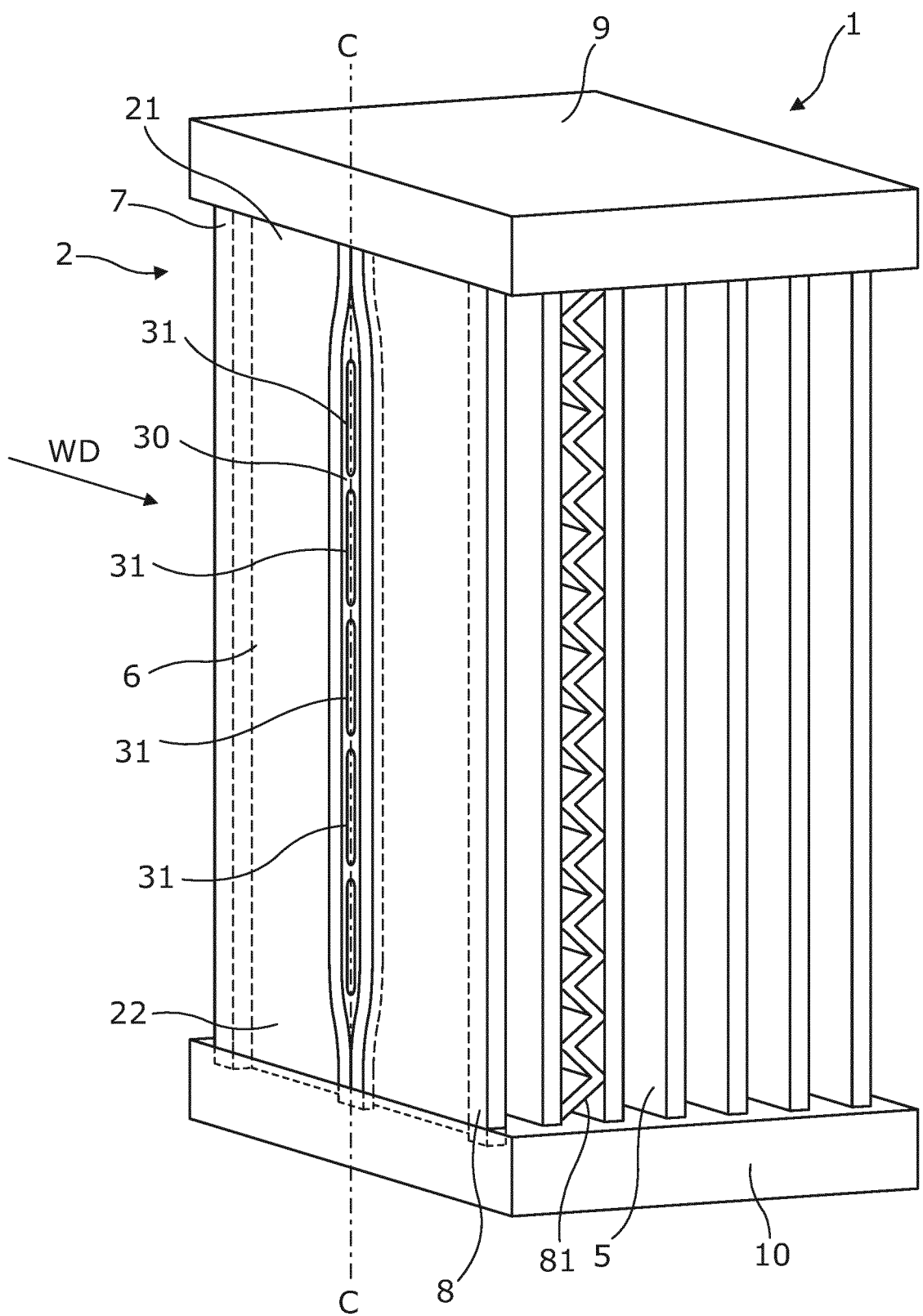

wall, a second outer wall and a second inner wall, the first inner wall, the second inner wall, the first outer wall and the second outer wall extending substantially parallel along the fluid tube in fluid-tight contact with the first wall and the second wall, wherein the heat exchanger is configured to lead the cooling fluid in a first direction in the first tube section and in a second direction in the second tube section, the first direction being opposite to the second, wherein the cooling fluid is led through the second tube section before entering the first tube section and the first tube section is arranged upstream of the second tube section in relation to the wind direction so that a cooling air flowing in the wind direction cools the cooling fluid with the lowest temperature first, wherein the first inner wall and the second inner wall are spaced apart by at least one common area defined by the first inner wall and the second inner wall, the first inner wall and the second inner wall being arranged at a distance from each other, and the at least one common area being arranged between the first tube section and the second tube section and that the common area comprises at least one slot.

22 Claims, 11 Drawing Sheets

(58) Field of Classification Search
USPC ........................................................ 165/175
See application file for complete search history.

(56) References Cited

U.S. PATENT DOCUMENTS

| | | | | |
|---|---|---|---|---|
| 5,490,559 | A * | 2/1996 | Dinulescu | F28B 1/06 |
| | | | | 165/148 |
| 5,632,331 | A * | 5/1997 | Shinmura | F28D 1/0341 |
| | | | | 165/176 |
| 5,718,285 | A * | 2/1998 | Oikawa | B21D 53/08 |
| | | | | 165/DIG. 466 |
| 5,930,894 | A * | 8/1999 | Oikawa | F28D 1/035 |
| | | | | 29/890.047 |
| 6,273,184 | B1 * | 8/2001 | Nishishita | F28D 1/0435 |
| | | | | 165/140 |
| 6,449,979 | B1 * | 9/2002 | Nagasawa | F28D 1/05391 |
| | | | | 62/503 |
| 6,745,827 | B2 * | 6/2004 | Lee | F25B 39/02 |
| | | | | 165/144 |
| 7,258,159 | B2 * | 8/2007 | Kume | F28D 1/0333 |
| | | | | 165/11.1 |
| 7,836,944 | B2 * | 11/2010 | Antonijevic | F28F 13/00 |
| | | | | 165/135 |
| 7,874,349 | B2 * | 1/2011 | Duong | F28F 9/002 |
| | | | | 165/173 |
| 8,037,929 | B2 * | 10/2011 | Higashiyama | F28F 9/0253 |
| | | | | 165/153 |
| 2003/0066633 | A1 | 4/2003 | Lee et al. | |
| 2007/0227714 | A1 * | 10/2007 | Takeuchi | F28F 1/08 |
| | | | | 165/151 |
| 2010/0012303 | A1 | 1/2010 | Domen | |
| 2010/0083694 | A1 * | 4/2010 | Takagi | F28D 1/05391 |
| | | | | 62/515 |
| 2011/0000640 | A1 * | 1/2011 | Jensen | F28F 9/026 |
| | | | | 165/47 |
| 2016/0018167 | A1 * | 1/2016 | Dziubinschi | F28F 3/044 |
| | | | | 165/177 |
| 2016/0216045 | A1 | 7/2016 | Chan | |

FOREIGN PATENT DOCUMENTS

| | | | |
|---|---|---|---|
| CN | 101925742 A | 12/2010 | |
| CN | 205066513 U | 3/2016 | |
| DE | 103 46 032 | 4/2004 | |
| DE | 10 2005 048 227 | 4/2007 | |
| DE | 10 2006 035 993 | 2/2008 | |
| EP | 1 840 494 | 10/2007 | |
| KR | 10-0790382 | 1/2008 | |
| KR | 100790382 B1 * | 1/2008 | ............. F28F 1/022 |

OTHER PUBLICATIONS

Extended European Search Report for EP Application No. 17181358.7 dated Jan. 5, 2018, 7 pages.
International Search Report and Written Opinion of the ISA for PCT/EP2018/069117 dated Oct. 18, 2018, 13 pages.

* cited by examiner

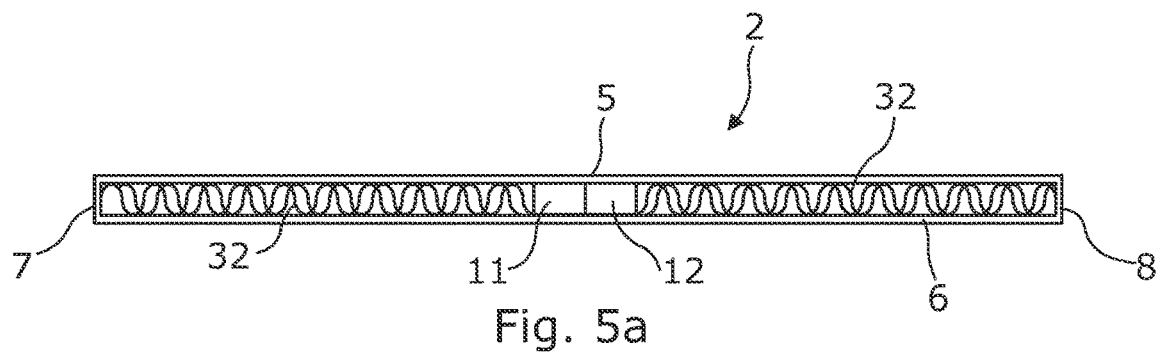
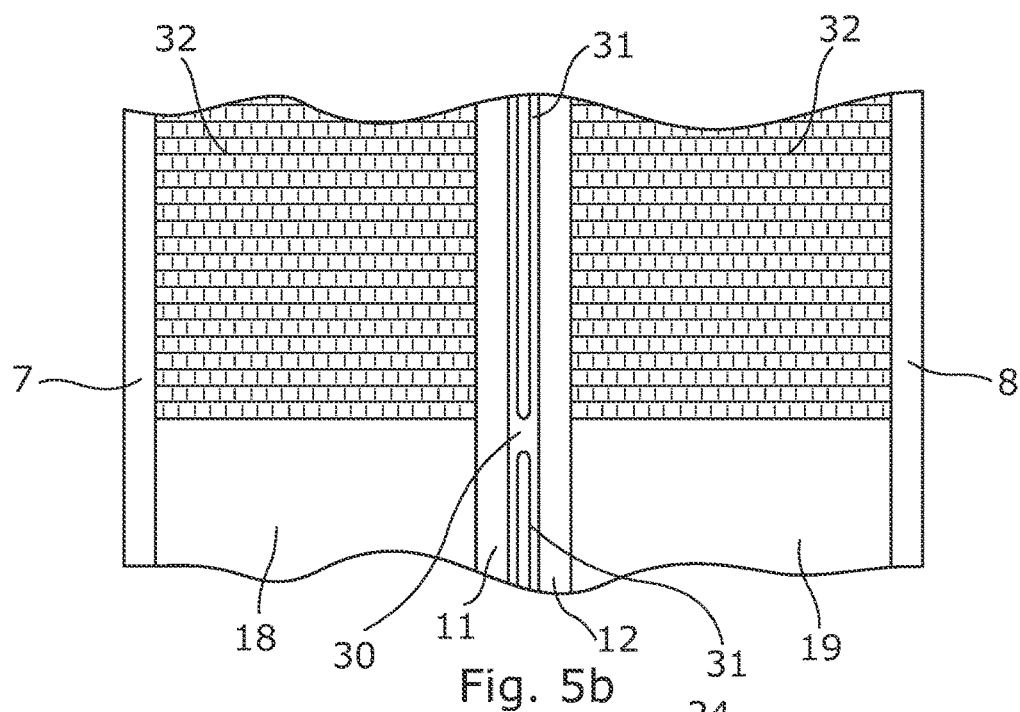
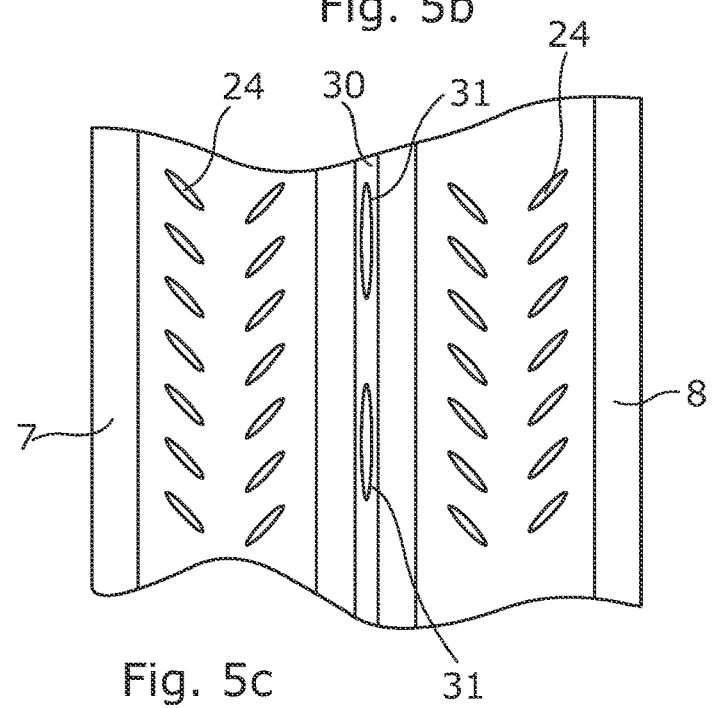

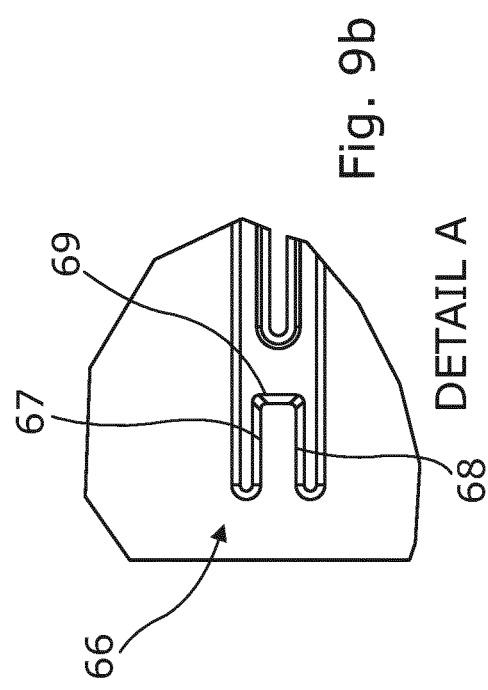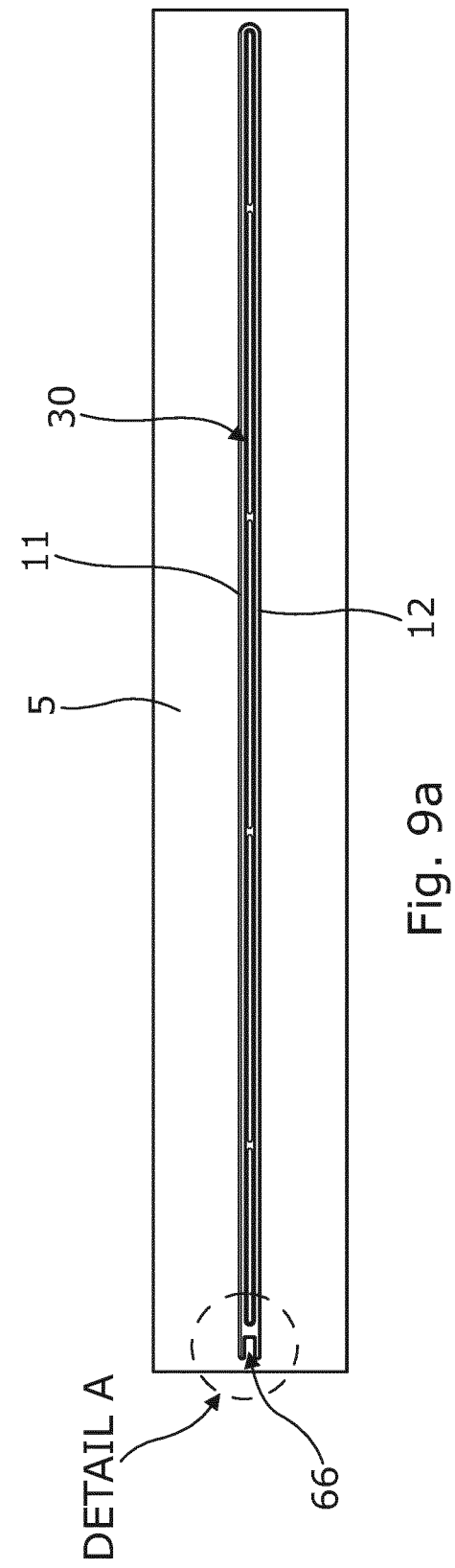

HEAT EXCHANGER COMPRISING FLUID TUBES HAVING A FIRST AND A SECOND INNER WALL

This application is the U.S. national phase of International Application No. PCT/EP2018/069117 filed Jul. 13, 2018 which designated the U.S. and claims priority to EP Application No. 17181358.7 filed Jul. 14, 2017, the entire contents of each of which are hereby incorporated by reference.

A heat exchanger comprising at least one fluid tube configured to extend substantially orthogonally to a wind direction, the fluid tube having a first wall and a second wall, and the fluid tube comprising a first tube section and a second tube section each extending along the fluid tube, arranged such that each tube section is in fluid communication with a pair of manifolds and configured to contain a cooling fluid.

In order to provide cooled cooling fluid to engines, generators and other heat generating equipment, heat exchangers are commonly used in order to reduce the working temperature of the heat generating equipment. Heat exchangers are usually divided into two groups: Active and passive heat exchangers.

In the field of e.g. wind turbines, passive heat exchangers are usually preferred due to their lower cost and more robust functionality. A passive heat exchanger utilises the wind, for example the wind flowing around the nacelle of the wind turbine, to cool a number of fluid tubes through which the cooling fluid is led, thereby decreasing the temperature of the cooling fluid. After the temperature of the cooling fluid has been reduced, it is led back to the heat generating equipment in order to cool it.

Achieving a desirable cooling effect usually requires a large passive heat exchanger with a large number of fluid tubes defining a large cooling area receiving the cooling wind. However, the space available on the nacelle in question is limited. Furthermore, the relatively high weight of a larger heat exchanger may lead to a number of structural challenges as well as production challenges.

Accordingly, conventional heat exchangers have shown not to provide a solution which allows for more efficient cooling and a more compact design.

It is an object of the present invention to wholly or partly overcome the above disadvantages and drawbacks of the prior art. More specifically, it is an object to provide an improved heat exchanger which provides a more efficient cooling.

The above object, together with numerous other objects, advantages, and features, which will become evident from the below description, are accomplished by a solution in accordance with the present invention by a heat exchanger comprising at least one fluid tube configured to extend substantially orthogonally to a wind direction, the fluid tube having a first wall and a second wall, and the fluid tube comprising:

a first tube section and a second tube section each extending along the fluid tube, arranged such that each tube section is in fluid communication with a pair of manifolds and configured to contain a cooling fluid, wherein the first tube section is formed by the first wall, the second wall, a first outer wall and a first inner wall and the second tube section is formed by the first wall, the second wall, a second outer wall and a second inner wall, the first inner wall, the second inner wall, the first outer wall and the second outer wall extending substantially parallel along the fluid tube in fluid-tight contact with the first wall and the second wall, the heat exchanger is configured to lead the cooling fluid in a first direction in the first tube section and in a second direction in the second tube section, the first direction being opposite to the second direction, wherein the cooling fluid is led through the second tube section before entering the first tube section and the first tube section is arranged upstream of the second tube section in relation to the wind direction. Thus, the cooling fluid is subjected to more cooling air with the same number of tubes and/or cooling area, whereby the cooling efficiency of the heat exchanger is significantly increased. Accordingly, a more efficient heat exchanger can be achieved without increasing the dimensions or the number of fluid tubes. Also, the cooling air flowing in the wind direction cools the cooling fluid with the lowest temperature first, which significantly increases the cooling efficiency of the heat exchanger.

The first inner wall and the second inner wall is spaced apart by at least one common area defined by the first inner wall and the second inner wall, the first inner wall and the second inner wall being arranged at a distance from each other, and the at least one common area being arranged between the first tube section and the second tube section and that the common area comprises at least one slot. Thereby, the cooling air entering the heat exchanger is further allowed to provide additional cooling effect by passing through the slot(s), resulting in an increase of cooling efficiency. Furthermore, the slot(s) disallow(s) heat transfer between the tube sections ensuring an increased temperature difference between the tube sections. Hence, it is achieved that the coolest air is guided to cool the cooling fluid of the lowest temperature. In this way, a counter flow is created and hence, a more efficient cooling is achieved.

The distance may be between 1 mm and 25 mm, more preferably between 2 mm and 15 mm, and even more preferably between 3 mm and 10 mm.

Moreover, the width of the slot(s) may be 0.1 mm to 20 mm or more preferably 0.5 mm to 10 mm or most preferred 1.25 mm to 5 mm. In this way, it is achieved that the airgap provided by the slot(s) is sufficient to stop the heat transfer in the material of the tubes.

Additionally, the first walls of both the first tube section and the second tube section may be made of one piece of sheet metal.

Similarly, the second walls of both the first tube section and the second tube section may be made of one piece of sheet metal.

Furthermore, the wall and the inner wall and the outer walls may be made from one piece of sheet metal.

Moreover, the first outer wall and the second outer wall may be formed by a pair of sidewalls of the fluid tube. This allows for a more cost-efficient heat exchanger since it does not require a plurality of inner walls.

Further, the second outer wall may be an additional inner wall partly forming an additional tube section. Alternatively, the first outer wall may be an additional inner wall partly forming an additional tube section.

Additionally, the at least one slot may be an elongated slot extending along a longitudinal axis of the fluid tube. With this advantage, said longitudinal axis may be a centreline extending along the length of the fluid tube.

Furthermore, the at least one fluid tube may be a flat fluid tube.

Also, each common area may comprise a plurality of slots.

Additionally, turbulators may be arranged inside the tube sections. The turbulators create a turbulent flow of cooling fluid through the tube sections. This further increases the cooling efficiency of the heat exchanger, since the turbulent flow increases the ability of the cooling fluid to exchange heat with the inner walls of the tube sections.

The turbulator may be formed by dimples arranged on the first wall and/or on the second wall of the fluid tube. This allows for a turbulent flow without introducing any additional components in the heat exchanger, making the manufacturing and assembling process faster, less complex and more cost-efficient.

The turbulators may be formed by turbulator inserts arranged inside the tube sections. Thus, a turbulent flow may be achieved inside the tube sections in a simple and cost-efficient manner by simply arranging tubular inserts on top of one of the walls of the fluid tube during assembly.

The heat exchanger may comprise a plurality of fins, the fins may be throughgoing fins/lamellas i.e. fins extending from the very front of the heat exchanger to the very back of the heat exchanger seen in the direction of the wind.

The heat exchanger may thus comprise a plurality of fluid tubes and lamellas arranged between at least some of the said fluid tubes so as to extend through substantially the entire heat exchanger in the wind direction. In this way, an improved guidance of the wind is achieved and hence an improved cooling. The fins/lamellas may be connected to the walls of either the first or the second tube. The fins/lamellas may be connected to the walls of both the first and the second tube. In this way, it is possible to control the distribution of heat in the fins/lamellas.

Moreover, the first inner wall and the second inner wall may be formed by a pair of elongated bars.

Moreover, the first inner wall may comprise a pair of first diverging sections and the second inner wall may comprise a corresponding pair of second diverging sections, whereby the first diverging section extends towards the first outer wall and the second diverging section extends towards the second outer wall, whereby the first diverging sections are arranged opposite to the respective second diverging sections so as to form the common area.

In addition, the inner walls may each have a first end portion and a second end portion, whereby a side surface of the first end portion and the second end portion of the first tube section is in contact with a corresponding side surface of the first end portion and the second end portion of the second tube section. Accordingly, the risk for any leakage occurring in the connection points between the manifolds and the fluid tube is decreased.

Moreover, connection points formed by the side surfaces may be sealed by means of a sealing paste, which reduces the risk for leakages between the tube sections. The sealing paste may be adhesive, a liquid sealing or an adhering gasket.

Said connection point/joint may also be welded, e.g. by means of laser welding.

Advantageously, the sealing paste may be a soldering paste. This allows for a less complex manufacturing process and it further allows for the tube sections to be formed by punching the slots and soldering the tube sections together.

The first wall and/or the second wall may comprise at least one protruding element protruding from the said first or second wall, whereby said protruding element is configured to retain the first inner wall and the second inner wall so as to form the common area. The protruding element(s) direct(s) the inner walls during assembly so as to achieve a straight orientation of said inner walls along the longitudinal axis of the fluid tube and the protruding element(s) guarantee(s) that the common area is achieved and withheld, thus a more robust and efficient assembly of the heat exchanger is achieved.

Advantageously, the fluid tube may comprise a plurality of slots and protruding elements along the longitudinal axis of the fluid tube, whereby the protruding elements are arranged between the slots of the first wall and/or the slots of the second wall. This allows for more air to enter and circulate in the common area between the fluid tubes which further decreases the heat transfer through each wall and hence increases the overall cooling efficiency of the heat exchanger.

The fluid tube and the inner walls may be made of aluminium, which allows for a more efficient heat exchanger due to the advantageous heat transfer properties of aluminium. Furthermore, the relatively low weight of aluminium in comparison to e.g. steel, allows for a lighter heat exchanger which is easier to mount to a heat generating equipment.

Further, the fluid tube may be configured to extend in a vertical direction, whereby the pair of manifolds comprises a first manifold and a second manifold.

In addition, at least one end portion of the first wall and/or of the second wall may comprise a recess configured to receive the first end portion or the second end portion of the inner walls, so as to retain the first end portions or the second end portions in a position whereby said first end portions or second end portions are in direct contact inside the recess. This allows for securing the tight sealing between the inner walls in a non-complex and cost-efficient manner.

Also, the area of the slot(s) may equal to more than 50% of the common area.

Furthermore, the length of the slot or the combined length of the slots along the longitudinal axis of the tube may be more than 50% of the common area, or more than 60% or more preferred more than 70%. In this way, it is achieved that the heat transfer is efficiently stopped from transferring from the one tube to the other.

The fluid tubes may be flat tubes having a substantially rectangular cross section seen perpendicular to the direction of the flow of the fluid. The inner walls may be substantially perpendicular to the sides of the fluid tubes.

Further, the outer walls may be formed by a pair of elongated bars.

The heat exchanger may be a plate and bar heat exchanger.

Also, the heat exchanger may be a block heat exchanger.

Furthermore, the inner walls may be interconnected by means of the common area, whereby the common area is formed by embossing the first wall and/or embossing the second wall so as to form said inner walls and the common area.

The fluid tube may have a first end and a second end, whereby the inner walls are joined at the ends of the fluid tube and each end extends into one of the manifolds. In this way, it is achieved that the tube does not need a further part to achieve a sealing contact between the inner walls of tube and this makes the heat exchanger more cost-efficient to manufacture and assemble.

Finally, the first inner wall and the second inner wall may be formed by means of pressing of the first wall and the second wall.

The present invention also relates to a wind turbine comprising a heat exchanger as described above.

Figure 2:
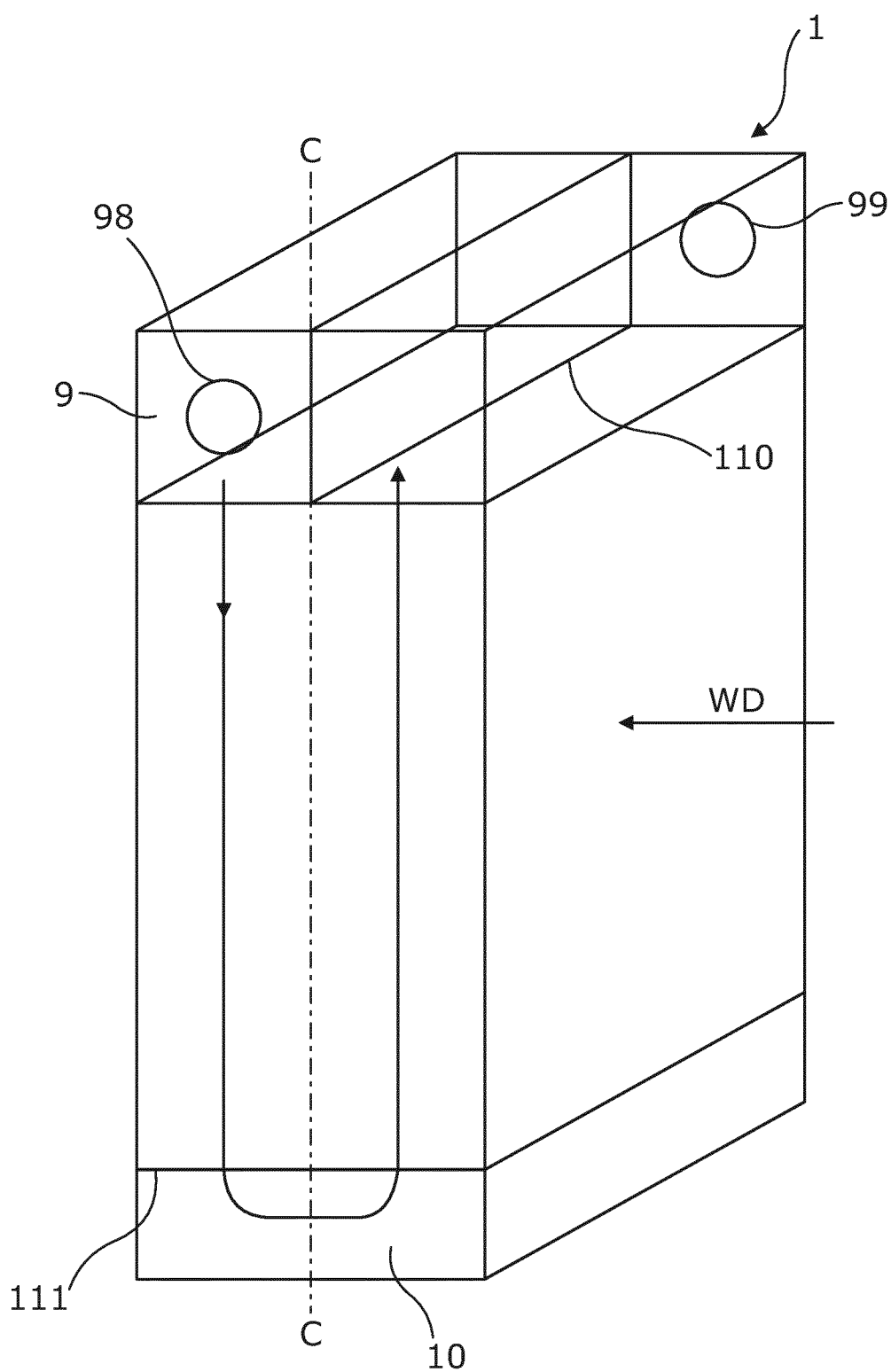
Figure 3:
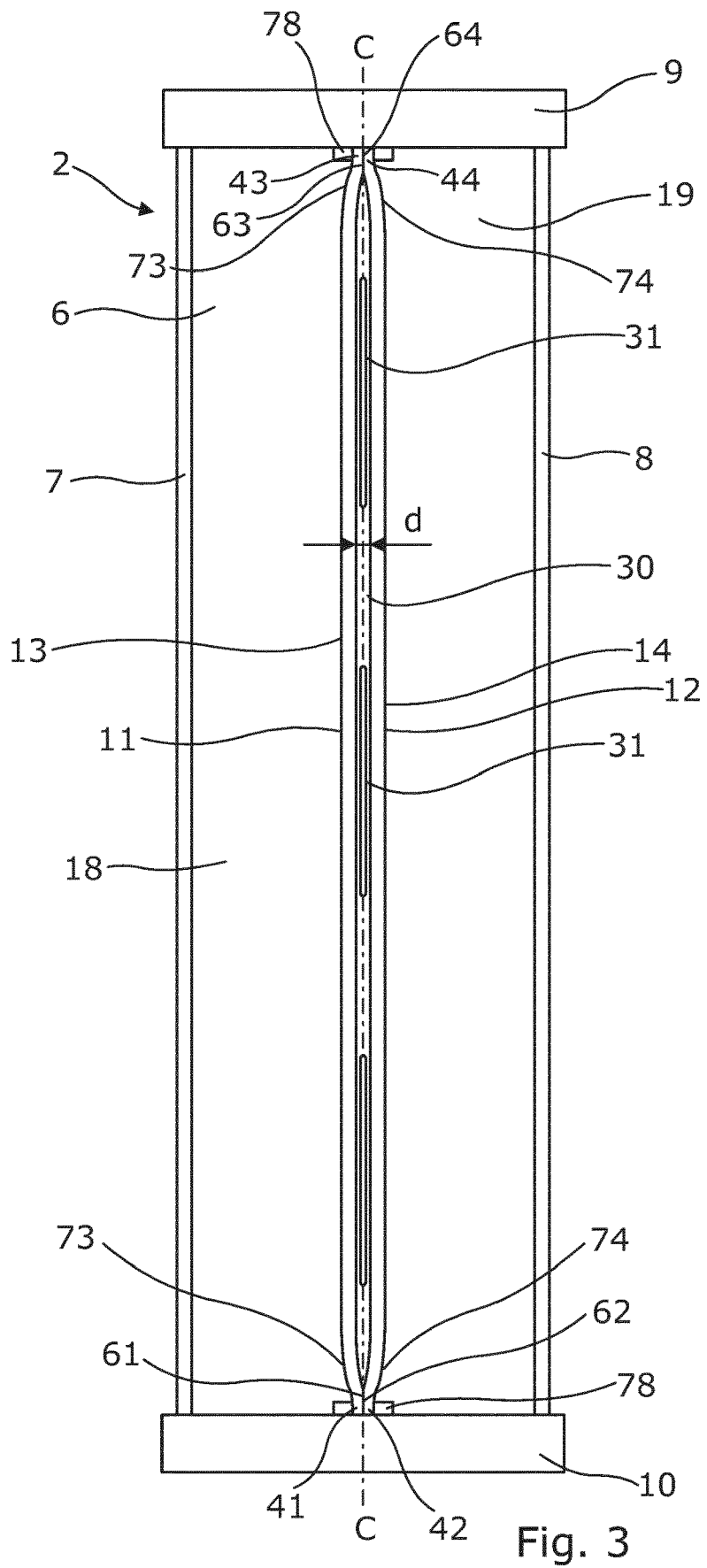
Figure 4:
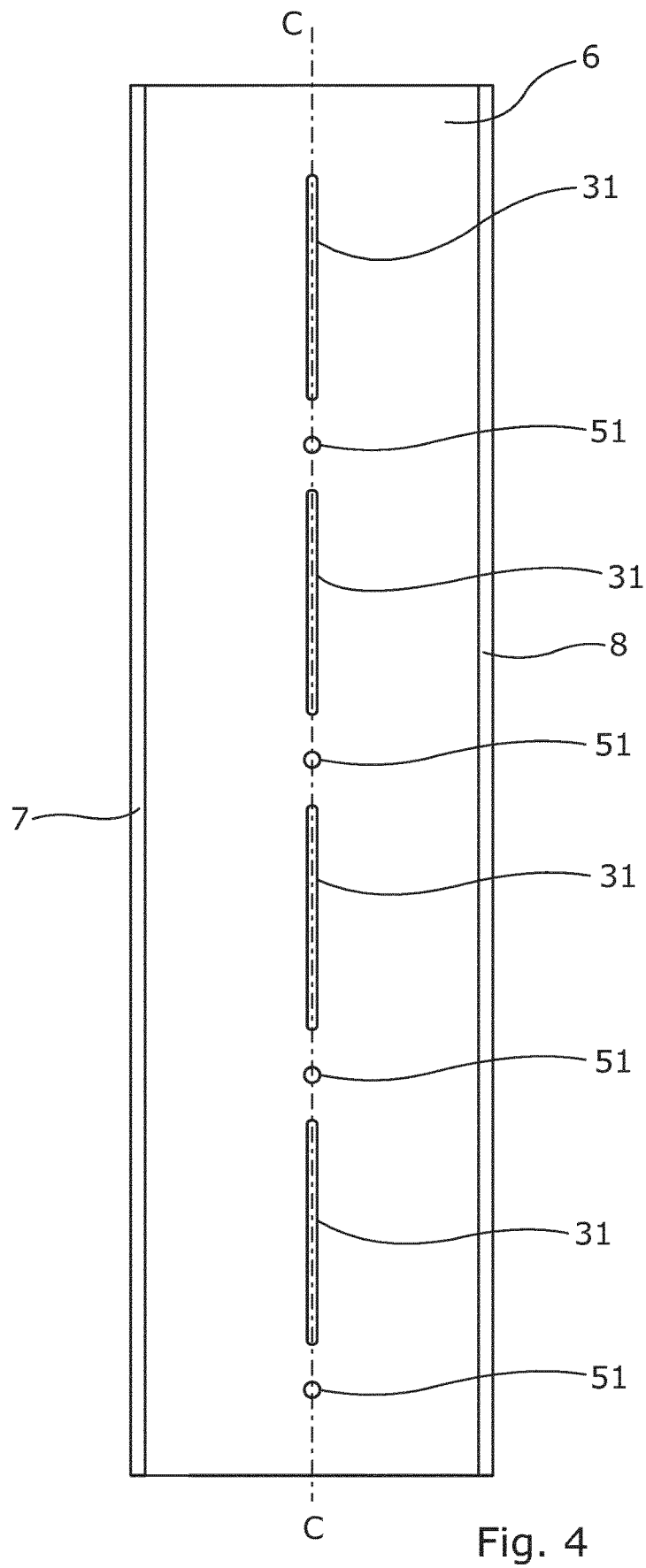
Figure 6:
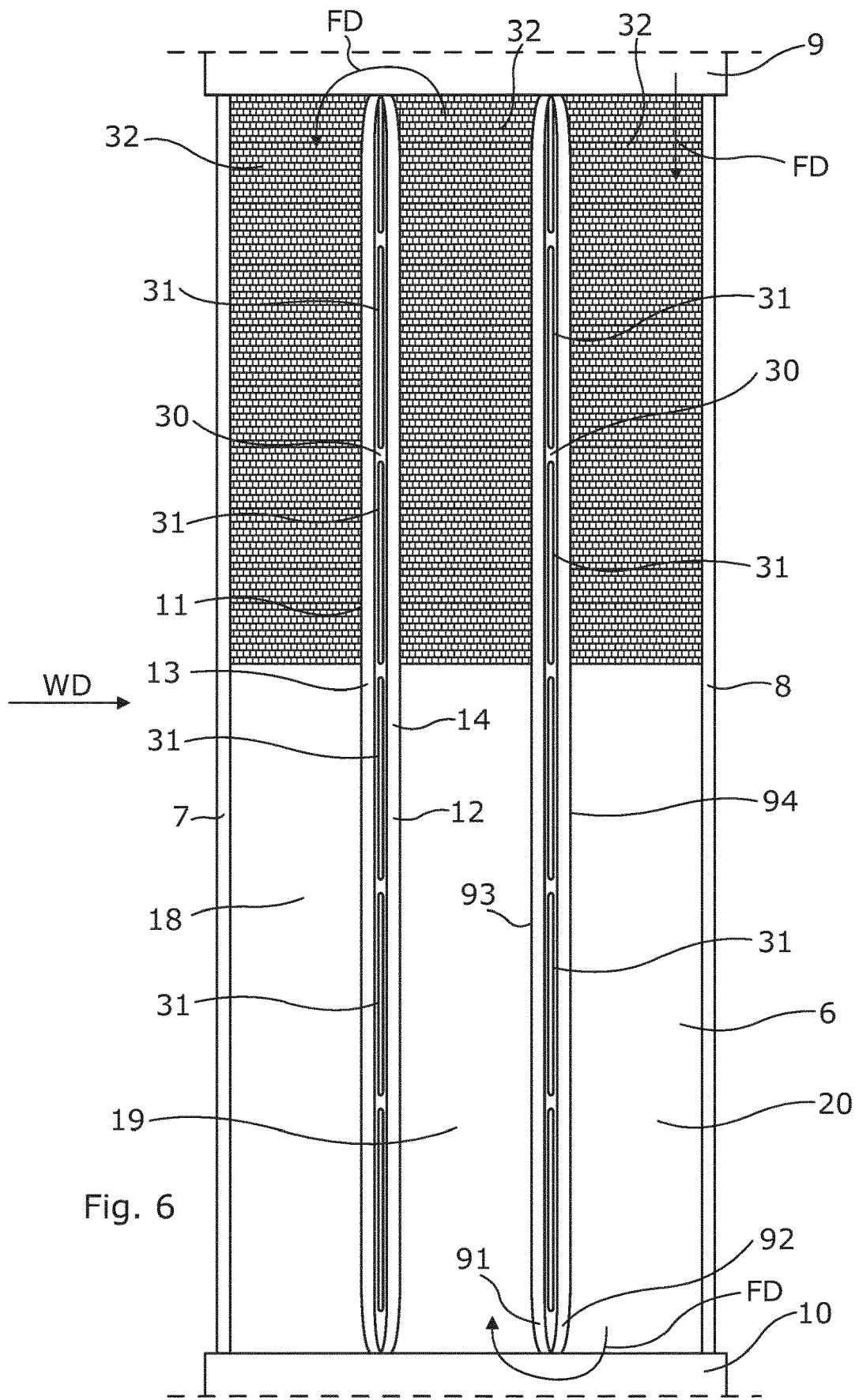
Figure 7:
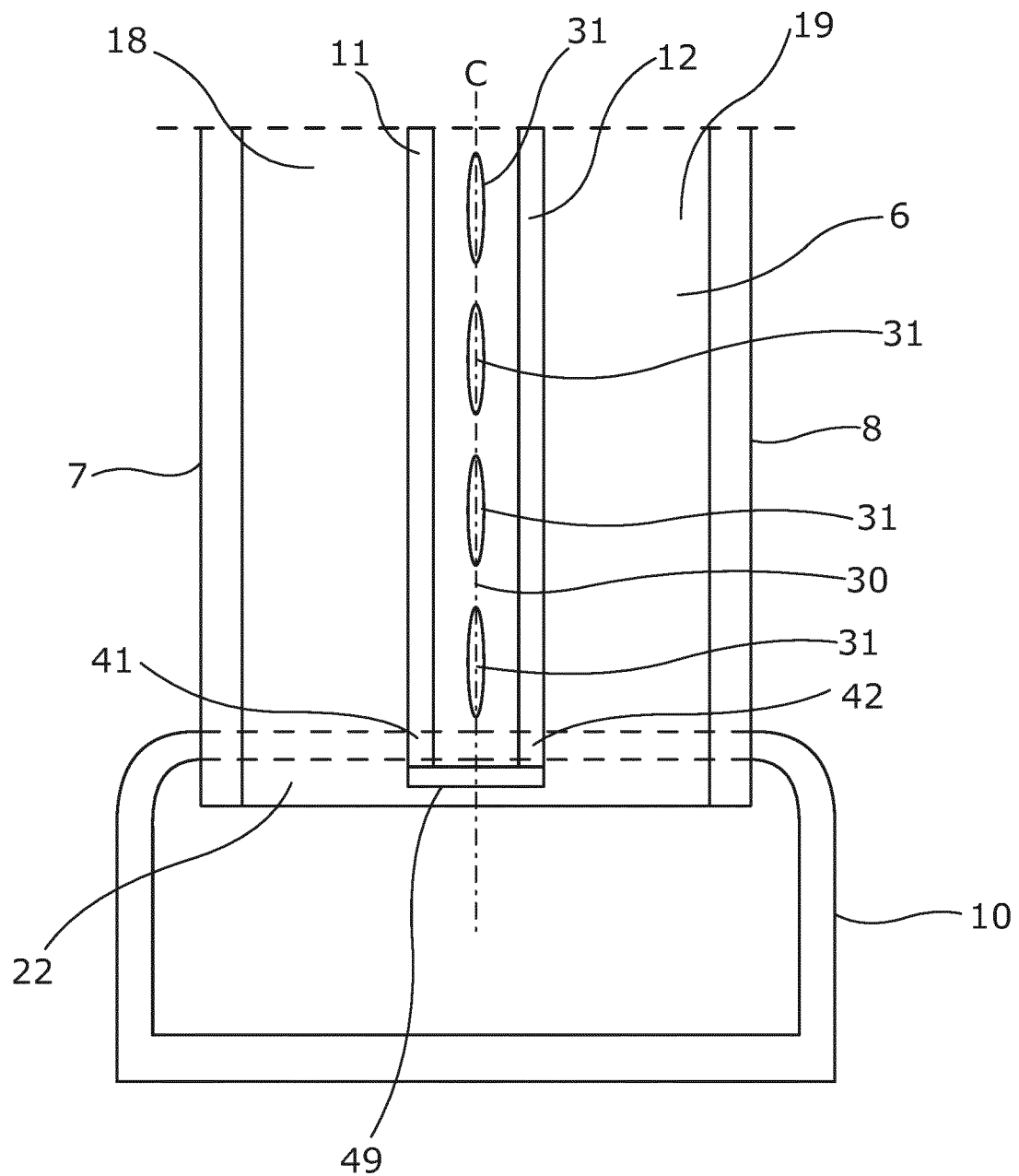
Figure 8A:
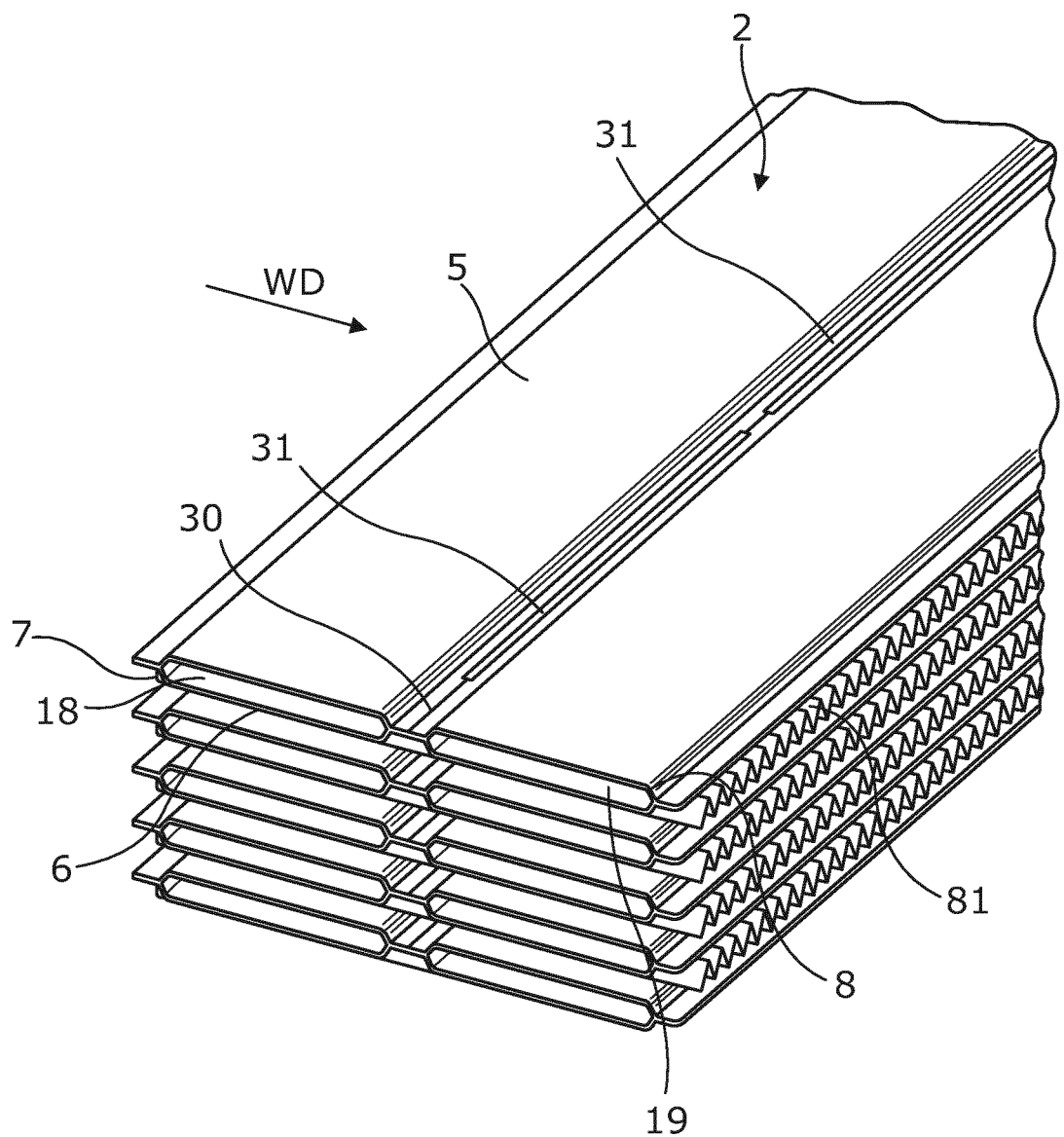
Figure 8B:
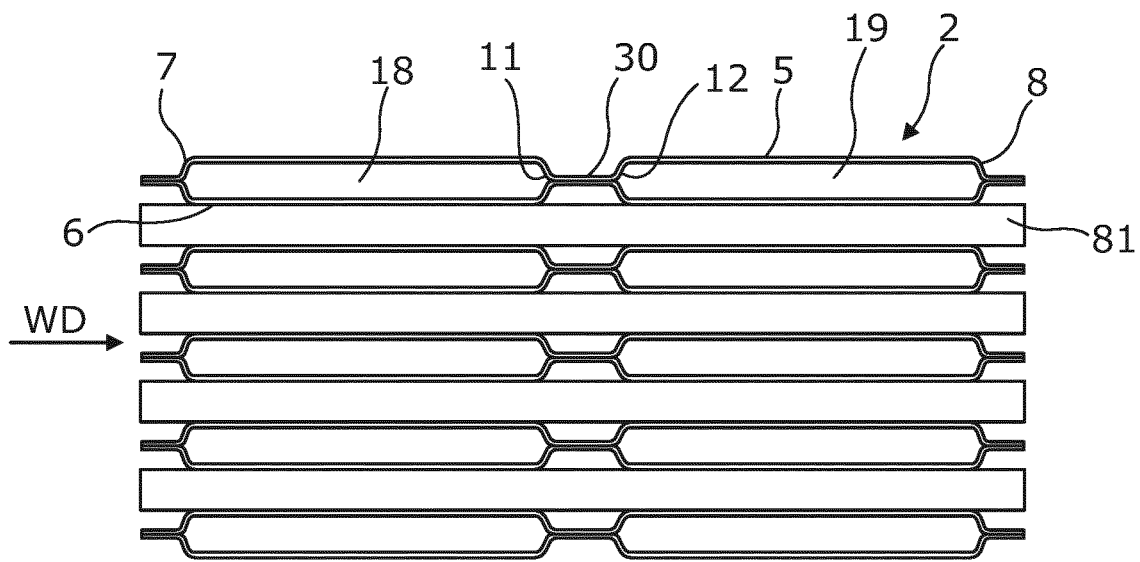
Figure 8C:
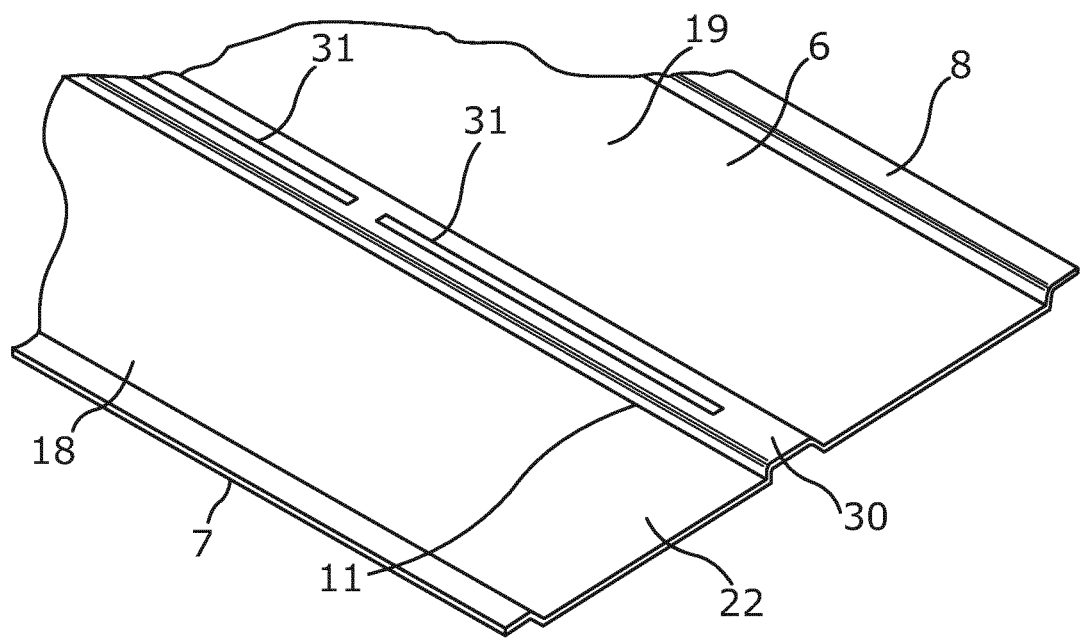

The invention and its many advantages will be described in more detail below with reference to the accompanying schematic drawings, which for the purpose of illustration show some non-limiting embodiments and in which:

FIG. 1 shows a perspective view of a heat exchanger of one embodiment,

FIG. 2 shows a schematic view of the fluid and cooling air flow through the heat exchanger of one embodiment, FIG. 3 shows a cross-sectional view of a fluid tube of the heat exchanger of one embodiment, FIG. 4 shows a cross-sectional view of the fluid tube of the heat exchanger of one embodiment, FIGS. 5a-c show cross-sectional views of the fluid tube of the heat exchanger of one embodiment, FIG. 6 shows a cross-sectional view of the fluid tube of the heat exchanger of one embodiment, FIG. 7 shows a cross-sectional view of the fluid tube of the heat exchanger of one embodiment, FIG. 8a shows a perspective view of a stack of fluid tubes having lamellas/fins arranged in-between the fluid tubes according to one embodiment of the invention, FIG. 8b shows a cross-sectional view (end view) of a stack of fluid tubes having lamellas/fins arranged in-between, FIG. 8c shows a perspective view of a single plate for a fluid tube according to one embodiment, and FIGS. 9a-9e show yet another embodiment of the fluid tube.

All the figures are highly schematic and not necessarily to scale, and they show only those parts which are necessary in order to elucidate the invention, other parts being omitted or merely suggested.

FIG. 1 shows a perspective view of a heat exchanger, i.e. a radiator, which may be configured to be fitted to e.g. a wind turbine nacelle. The heat exchanger 1 comprises a pair of manifolds 9, 10, connected by means of at least one, but preferably, a plurality of fluid tubes 2 extending between said manifolds 9, 10. The plurality of fluid tubes 2 defines a cooling area configured to be orthogonally to a wind direction WD, whereby air is allowed to flow through the heat exchanger 1 between the fluid tubes in order to cool the cooling fluid inside fluid tubes 2.

Advantageously, the fluid tube 2 may be a flat fluid tube 2. Hence, the plurality of fluid tubes 2 forming the cooling area of the heat exchanger 1 may be flat fluid tubes, whereby the heat exchanger 1 may be a flat fluid tube heat exchanger.

Said fluid tube comprises a first wall 5 and a second wall 6 joined together by means of a first outer wall 7 and a second outer wall 8, so as to form a substantially rectangular cross-section.

As shown in FIG. 1, the first outer wall 7 and the second outer wall 8 may be formed by a pair of sidewalls of the fluid tube 2. Said first outer wall 7 and second outer wall 8 may be formed by a pair of elongated bars, whereby the first wall 5 and the second wall 6 may be formed by a pair of plates.

Preferably, each of the fluid tubes of the heat exchanger 1 may formed by said pair of plates and bars, whereby the heat exchanger 1 may be a plate and bar heat exchanger.

With reference to FIG. 1, the heat exchanger 1 may be a top-bottom heat exchanger, or in other words a heat exchanger 1 wherein the fluid tubes 2 are configured to extend in a vertical direction, whereby the pair of manifolds 9, 10 comprises a first manifold 9 and a second manifold 10.

Yet again referring to FIG. 1, the fluid tube 2 has a first end 21 and a second end 22 each extending into a manifold of the pair of manifolds 9, 10. The heat exchanger 1 may accordingly comprise a plurality of fluid tubes 2 each having a first end 21 and a second end 22, each end extending into a manifold of the pair of manifolds.

Furthermore, the heat exchanger 1 may comprise fins 81 configured to optimise the air flow through said heat exchanger 1. The fins 81 may be throughgoing fins i.e. lamellas extending from the front of the heat exchanger to the back of the heat exchanger in the wind direction. Advantageously, said fins 81 extend from the very front to the very back of said heat exchanger in the wind direction. Accordingly, the heat exchanger 1 may comprise a plurality of fluid tubes 2 and lamellas 81 arranged between at least some of said flat tubes 2 so as to extend along substantially the entire heat exchanger 1 in the wind direction.

Preferably, said heat exchanger 1 comprises a plurality of fluid tubes, whereby the fins/lamellas may be connected to the walls of either a first fluid tube or a second fluid tube. Alternatively, said fins/lamellas may be connected to the walls of both the first fluid tube and the second fluid tube. Hence, control of the distribution of heat in the fins/lamellas is enabled.

Now referring to FIG. 2, to further increase the cooling efficiency, the heat exchanger may be configured to lead the cooling fluid in a first direction in a first tube section and in a second direction in a second tube section, the first direction being opposite to the second direction, whereby the cooling fluid is led through the second tube section before entering the first tube section and the first tube section is arranged in front of the second tube section in the wind direction (as depicted with the arrow and WD). In other words, the first tube section is arranged in front of the second tube section so as to receive the cooling air moving in the wind direction before the second tube section.

This allows for the cooling fluid with the lowest temperature, i.e. the cooling fluid which has already been cooled inside the second tube section, to be cooled by the coolest air, i.e. the cooling air first entering the heat exchanger 1. This has been proven to be very advantageous in terms of cooling efficiency, since the lowest temperature reached in the heat exchanger is effectively reduced.

The leading of the cooling fluid first through the second tube section and then through the first tube section may, as the skilled person realises, be performed in any number of ways, e.g. the manifold may comprise inner well sections configured to block the cooling fluid from moving/flowing through the manifold and lead it through the fluid tubes instead. It may also be achieved by means of the pressure difference between the manifolds which simply force the cooling fluid along the desired flow path.

Further referring to FIG. 2, the heat exchanger manifolds 9, 10 may comprise a cooling fluid inlet 98 and a cooling fluid outlet 99, each of which are connected to the cooling system of the heat generating equipment. Cooling fluid is accordingly led into the heat exchanger 1 via the inlet in one of the manifolds and led back to the heat generating equipment after it has been cooled inside the heat exchanger by means of the outlet in one of the manifolds. The first manifold 9 may comprise the inlet 98 and the outlet 99. Said first manifold 9 is separated into two separate compartments by means of a dividing wall 110 extending along the length of the first manifold 9. The inlet 98 is accordingly in fluid communication with one compartment of the first manifold 9 while the outlet 99 is in fluid communication with the other compartment of the first manifold 9. The cooling fluid is thus allowed to move from the inlet 98 to the outlet 99 via the fluid tubes and the second manifold 10 according to the advantageous manner described above.

With the aforementioned measures, an efficient back-front counter-flow heat exchanger is achieved. However, the problem with such a heat exchanger is that the cooling efficiency is very reliant on the temperature difference between the back and front of the heat exchanger and is thus greatly susceptible for any heightening of the minimum cooling fluid temperature in the front of the heat exchanger.

With reference to FIG. 3, an arrangement serving to mitigate this drawback will be described.

Referring to FIG. 3, a cross-section along the length of the fluid tube 2 is shown. Hence, FIG. 2 shows the second wall 6 as a bottom surface. As shown, the heat exchanger comprises at least one fluid tube configured to extend substantially orthogonally to a wind direction, whereby the fluid tube has a first wall 5 (shown in FIG. 1) and a second wall 6. The fluid tube 2 comprises a first tube section 18 and a second tube section 19 extending along the fluid tube each in fluid communication with a pair of manifolds 9, 10 and configured to contain a cooling fluid. The first tube section 18 is formed by the first wall i.e. a first sheet plate (not visible), the second wall 6, a first outer wall 7 and a first inner wall 11 and the second tube section is formed by the first wall 5, the second wall 6, a second outer wall 8 and a second inner wall 12. The first outer wall 7 and the second outer wall 8 extending substantially parallel along the fluid tube in fluid-tight contact with the first wall (not visible) and the second wall 6.

Thus, the first tube section 18 and second tube section 19 each forms a fluid-tight compartment inside the fluid tube extending along the entire length of the fluid tube. Accordingly, the entirety of cooling fluid flowing through the fluid tube may flow through both the first tube section 18 and through the second tube section 19.

This allows for more efficient cooling since the cooling fluid running through the fluid tubes 2 is subjected to more cooling air on its way through the heat exchanger, since the flow path of the cooling fluid through the heat exchanger is extended. Accordingly, a more efficient cooling may be achieved with the same outer proportions of the heat exchanger. Furthermore, the dividing of the cooling fluid with simple insertion of additional inner walls allows for a simple and relatively inexpensive way to increase the cooling efficiency.

The fluid tube 2 or the plurality of fluid tubes and the inner walls 11, 12 may preferably be made of aluminium. This is particularly beneficial due to its excellent heat transfer properties and moreover, it allows for a lighter heat exchanger due to the low weight of the material.

The first inner wall 11 and the second inner wall 12 are separated by at least one common area 30 defined by the first inner wall 11 and the second inner wall 12, whereby the first inner wall 11 and the second inner wall 12 are arranged at a distance d from each other, whereby the at least one common area is arranged inside the fluid tube 2 and comprises at least one slot 31. This allows air to enter through the fluid tube 2 through the slot 31 whereby the cooling efficiency is further increased since the surface area of the tubes receiving the cooling wind is increased. Accordingly, the slots 31 are configured to lead the cooling air through the fluid tubes 2.

Moreover, the slot 31 may be an elongated recess extending along a longitudinal axis C extending along the length of the fluid tube 2. Said longitudinal axis may preferably be a centreline.

As shown in FIG. 3, the distance d may vary across the longitudinal axis C, whereby the width of the common area 30 may be of any shape.

Furthermore, and most importantly, said slots 31 provide an insulating effect which prevents heat transfer between the tube sections and thus ensuring the temperature difference between said tube sections. Accordingly, the colder temperature of the cooling fluid in the first tube section is maintained when the cooling fluid circulates through the fluid tube compartments making the cooling more efficient.

Hence, the slots provide a solution to the aforementioned problem of providing and maintaining the temperature difference between the back and the front of the heat exchanger since the warmer cooling fluid inside the second tube section and consequently the warmer walls of said tube sections, cannot affect the temperature of the cooling fluid inside the first tube section via the walls of said first tube section. This has been proven very efficient, leading to an increase of about 2-10% in cooling efficiency.

Also, the arrangement with fluid compartments provided with slots allows for a less complex solution for achieving an efficient counter-flow heat exchanger which is cheaper to manufacture and more compact since additional fluid pipes are not required in order to achieve the desired counter-flow effect. Instead, the counter-flow may be provided inside each fluid tube.

Said slots may be 0.1 mm to 20 mm wide or more preferably 0.5 mm to 10 mm wide or most preferred 1.25 mm to 5 mm wide. In this way, it is achieved that the air gap provided by the slot is sufficient to stop the heat transfer in the material of the tubes.

Further referring to FIG. 3, the first inner wall 11 comprises a pair of first diverging sections 73 and the second inner wall 12 comprises a corresponding pair of second diverging sections 74, whereby the first diverging sections 73 extend towards the first outer wall 7 and the second diverging sections 74 extend towards the second outer wall 8, whereby the first diverging sections 73 are arranged opposite to the respective second diverging sections 74 so as to form the common area 30. The diverging sections thus form a wider section of the common area with a maximum distance d between the first curved section and the second curved section where the slot 31 may be arranged. Thus, the slot arrangement which allows for a more efficient cooling can be provided in a space-consuming manner since the first inner wall 11 and the second inner wall 12 may be placed very close to each other while still enabling the provision of the common area and the slots, i.e. a more compact cooling arrangement can be achieved. Each common area 30 may comprise a plurality of slots 31.

As shown in said FIG. 3, the first inner wall 11 and the second inner wall 12 may be formed by a pair of elongated bars. Accordingly, the inner walls 11, 12 as well as the outer walls 7, 8 may be formed by bars, whereby the first wall and the second wall may be formed by plates.

Notably, the pair of first diverging sections 73 and the pair of second diverging sections 74 may be bent portions of the elongated bars forming the first inner wall 11 and the second inner wall 12. Accordingly, the elongated bars forming the inner walls 11, 12 extend along the longitudinal axis C with a portion being bent so as to form the common area 30.

Said pair of first diverging sections 73 may delimit a first intermediate section 13 of the first inner wall 11, the intermediate section 13 extending substantially along the longitudinal axis C of the fluid tube. Said pair of second diverging sections 74 may similarly delimit a second intermediate section 14 of the second inner wall 12, the second intermediate section 14 extending substantially along the longitudinal axis C of the fluid tube. Said intermediate sections are preferably arranged at the distance d from each other.

In one embodiment, the length of the slot 31 or the combined length of the slots along the length of the fluid tube is more than 50% of the common area or more than 60%, or more preferred more than 70%. In this way, it is achieved that the heat transfer is efficiently stopped from transferring from one fluid tube to the other.

The distance d may accordingly be between 1 mm and 25 mm, more preferably between 2 mm and 15 mm, and even more preferably between 3 mm and 10 mm. However, as previously stated, it may vary along the length of the fluid tube.

Referring to FIG. 3, to achieve a sealing effect between the inner walls, the inner walls may be joined at the first end as well as at the second end of the fluid tube, whereby the first end and the second end may extend into the manifolds. Accordingly, it is not required with a further part to close the gap between the tubes, which makes for a more cost-efficient manufacturing process.

This is achieved by means of the tube inner walls 11, 12 each having a first end portion 43, 44 and a second end portion 41, 42, whereby a side surface 63, 61 of the first end portion 43 and the second end portion 41 of the first tube section 18 is in contact with a corresponding side surface 62, 64 of the first end portion 42 and the second end portion 44 of the second tube section 19. Hence, the risk for leakage in the connection between the fluid tube and the manifolds 9, 10 is reduced. This sealing effect may be further increased by means of a sealing paste. Accordingly, the joining points formed by the side surfaces 61, 63 and side surfaces 62, 64 may be sealed by means of a sealing paste. For example, the sealing paste may be an adhesive, a liquid sealing or an adhering gasket.

The sealing paste may also be a soldering paste. This allows for a less complex manufacturing process, since it allows for the tube sections to be formed by punching the slots and soldering the tube sections together.

With advantage the ends of the fluid tube may extend into the manifolds of the heat exchanger. Thus, it is enabled for the first end portions and the second end portions to be in direct contact only inside the respective manifold, whereby the sealing is provided without any risk for heat transfer between the inner walls 11, 12 due to the direct contact.

In one embodiment, the aforementioned side surfaces may be joined by welding, i.e. laser welding. Thus a simple and reliable sealing may be achieved, while the joining is more robust compared to for example side surfaces joined by means of soldering.

Further, at least one end portion of the first wall 5 and/or the second wall 6 comprises a recess 78 configured to receive the first end portions 41, 43 or the second end portions 42, 44 of the inner walls 11, 12 so as to retain the first end portions 41, 43 or the second end portions 42, 44 in a position whereby said first end portions 41, 43 or second end portions 42, 44 are in direct contact inside the recess 78. This allows for securing the tight sealing between the inner walls in a non-complex and cost-efficient manner. This is particularly advantageous if the first inner wall 11 and the second inner wall 12 are formed by a pair of elongated bars, since the recess serves to bend and retain the bars so as to achieve the direct contact between said bars. Accordingly, the mounting of the heat exchanger is made more efficient and simpler since the bars are kept in positon by said recess.

In some embodiments, the heat exchanger may comprise a plurality of common areas 30 each formed by sections of the first inner wall 11 and the second inner wall 12 being in direct contact and a plurality of pairs of diverging sections 73, 74 configured to form a plurality of common areas 30. Preferably, the diverging sections are interconnected by intermediate sections extending straight along the longitudinal axis C of the fluid tube.

In some other embodiments, the first inner wall 11 and the second wall 12 may be formed by means of pressing of the first wall 5 and the second wall 6. Accordingly, the fluid tubes may comprise two U-profiles being pressed together along the edges along the length of the fluid tube, so as to form a first wall 5, a second wall 6, a first outer wall 7 and a second outer wall 8. The common area may thus be formed by punching of the centre of the fluid tube along said fluid tube, whereby the slots 31 may be formed by punching of the achieved common area 30.

FIG. 4 shows a cross section of the fluid tube where the inner walls and the first wall have been removed. Referring to said figure, the first wall (not shown) and/or the second wall 6 comprise(s) at least one protruding element 51 protruding from the said first or second wall, whereby said protruding element 51 is configured to retain the first inner wall and the second inner wall so as to form the common area. The protruding element 51 directs the inner walls along the longitudinal axis C of the fluid tube when the inner walls are positioned on top of one of the walls 5 or 6. Hence, a simple manner to align the inner walls is achieved, whereby the assembling of the heat exchanger is made less complex resulting in a lower general production cost. Hence, the protruding element(s) serve(s) to hold the inner walls in place and thereby in a simple manner it is ensured that the common area is achieved and withheld by means of the inner walls.

As presented in FIG. 4, the fluid tube may comprise a plurality of slots 31 and protruding elements 51, the slots 31 and the protruding elements 51 extend along the longitudinal axis C of the fluid tube, whereby the protruding elements 51 are arranged between the slots 31 of the first wall 5 (shown in FIG. 1) and/or the second wall 6. Thus, even more cooling air is allowed to enter through the fluid tube via the slots 31, whereby an even more efficient cooling is achieved. Furthermore, the plurality of protruding elements 51 allows for a more stable mounting of the inner walls.

Turning to FIGS. 5a-c, turbulators may be arranged inside the tube sections 18, 19. Turbulators are, as recognisable by the skilled person, flow-guiding elements configured to direct the flow of cooling fluid so as to create a turbulent flow. The turbulent flow achieved by the turbulators allows for an increased cooling efficiency due to the absence of the insulating boundary layer occurring in the contact between the cooling fluid and the walls of the fluid tube when the cooling fluid has a laminar flow pattern. Instead, the random movement of the fluid molecules, due to the turbulators breaking up the boundary layer, increases the heat exchanging capability of the cooling fluid.

In FIG. 5a and FIG. 5b, cross sections of the fluid tube 2 are depicted. In these embodiments, the turbulators arranged inside the tube sections 18, 19 are formed by turbulator inserts 32. By placing turbulator inserts inside the fluid section a simple and cost-efficient manner to achieve a turbulent flow inside fluid tube is achieved.

Referring to FIG. 5c, an embodiment is shown where the turbulators 24 arranged in the tube sections are dimples arranged on the first wall and/or the second wall of the fluid tube. The dimples re-direct the cooling fluid to achieve the turbulent cooling flow. This further enables the dimples to be stamped onto the first wall and/or onto the second wall 6. The stamping of the dimples is a fairly cost-efficient process, whereby a more cost-efficient way to achieve the turbulent flow is achieved. Furthermore, the number of components in the heat exchanger is reduced, which makes the production process less complex and further lowers the production cost.

Turning to FIG. 6, the second outer wall may be an additional inner wall 93 partly forming an additional tube section. A fluid tube is depicted in which the first tube section 18 is formed by the first wall, the second wall, a first outer wall 7 and a first inner wall 11. The second tube section 19 is formed by the first wall, the second wall, a second outer wall 93 and a second inner wall 12, the first inner wall 11, second inner wall 12, the first outer wall 7 and the second outer wall 93 extending substantially parallel along the fluid tube in fluid-tight contact with the first wall and the second wall.

The second outer wall 93 is thus an additional inner wall which forms an additional tube section 20 together with the outer wall 8 of the fluid tube. Further, the second outer wall 93 may together with an additional inner wall 94 form an additional common area 30 provided with slots 31, i.e. comprising slots 31. The flow of the cooling fluid is depicted as the arrows FD. Accordingly, the heat exchanger is configured to lead the cooling fluid through the additional tube section 20 via the second tube section 19 and the manifold 10 to the manifold 9 and the first tube section 18. The first tube section 18 is preferably arranged in front of the other tube sections in the wind direction WD, i.e. the first tube section is arranged so as to receive the cooling air before the other tube sections. As is easily recognisable for the skilled person, the fluid tube may comprise any number of inner walls forming separate tube sections extending along the fluid tube. Furthermore, each of said tube sections may be separated by common areas provided with slots.

Referring to FIG. 7, the end portions 41, 42 of the inner walls 11, 12, which may be a pair of elongated bars forming said inner walls may be connected by a cross-bar 49. Preferably, the cross-bar 49 is joined together with said inner walls 11, 12 by means of welding, i.e. laser welding.

The cross-bar allows for a less complex and tolerance susceptible manufacturing process since no bending is required in order to provide both sufficient sealing at the ends of the fluid tubes and the common area allowing the desirable cooling.

As depicted in said figure, the flat tube may extend into the manifold. This is particularly advantageous since the inner walls 11, 12 are joined together. With the flat tube extending into the manifold, the second end portions 41, 42 of the inner walls are arranged inside said manifold 9. However, if the joined end portions are arranged inside the manifolds where no heat exchanging takes place, this problem is mitigated while the desired sealing between said tube sections is achieved.

As is obvious for the skilled person, both the first end portions as well as the second end portions of the inner walls may extend into manifolds by means of the flat tube extending into said manifolds.

Turning to FIGS. 8*a*-*b*, a plurality of fluid tubes 2 are shown. The tubes which are flat tubes are in fluid communication with a pair of manifolds. The fluid tubes 2 are separated by means of lamellas 81 extending from the very front to the very back of said heat exchanger in the wind direction WD. Accordingly, the heat exchanger comprises a plurality of fluid tubes 2 and lamellas 81 arranged between at least some of said flat tubes 2 so as to extend along substantially the entire heat exchanger in the wind direction.

As depicted in said figures, the fluid tubes 2 may rest on each other only separated by means of the lamellas 81. Accordingly, said fluid tubes 2 may be arranged in a block heat exchanger manner whereby each fluid tube is separated by the next by means of the lamellas 81 and gaskets. Thus, the heat exchanger may be a block heat exchanger.

The inner walls 11, 12 are interconnected by means of the common area 30, whereby the common area 30 is formed by embossing the first wall 5 and/or the second wall 6 so as to form said inner walls 11, 12 and common area 30. As seen in the aforementioned figures, the outer sidewalls 7, 8 may be formed by folding joints extending along the length of the fluid tubes 2.

In said FIGS. 8*a*-*b*, both the first wall 5 and the second wall 6 have been embossed, however as is clear to the skilled person, the common area 30 as well as the first inner wall 11 and the second inner wall 12 may be achieved solely by embossing the first wall 5 or the second wall 6.

With this design, the entire fluid tube may be manufactured by folding and embossing of a single metal sheet and thereafter welding i.e. laser welding the remaining joint, i.e. one of the outer sidewalls 7, 8. It may also be achieved by means of having two separate metal sheets being independently embossed and welded together along their length at the outer sidewalls 7, 8. As seen in the aforementioned figures, the outer sidewalls 7, 8 are formed by folding joints extending along the length of the fluid tubes 2.

These production techniques are more cost-efficient in comparison to other conventional manners to achieve tube sections. Furthermore, no additional bars are required to achieve said sections. The absence of any solid bars makes the heat exchanger lighter and thus easier to fit on a heat generating equipment.

The heat exchanger may be a block heat exchanger, whereby the fins/lamellas 81 are required in order to create a distance between the fluid tubes allowing for the cooling air to pass through the heat exchanger between the fluid tubes 2.

Referring to FIG. 8*c*, a cross-section of the fluid tube is depicted. The fluid preferably extends into the manifolds, whereby the end 22 of the fluid tube consequentially extends into one of the manifolds.

To achieve a sealing effect between the inner walls, the inner walls may be joined at the first end as well as at the second end 22 of the fluid tube, whereby the first end and the second end may extend into the manifolds. Accordingly, it is not required with a further part to close the gap between the tubes, which makes for a more cost-efficient manufacturing process.

This is achieved by means of disposing the slots 31 so as to extend all the way to the ends of the fluid tube, whereby the inner walls are directly joined by means of the common area 30.

In FIG. 9*a* another embodiment of the fluid tube is shown. In present embodiment, the common area is formed by embossing the first wall 5 and/or the second wall 6 so as to form said inner walls 11, 12 and common area 30. At one end of the common area 30, a receiving section 66 is formed by embossing.

The receiving section 66 is shown in detail in FIG. 9*b*. The receiving section is substantially square-formed and has a first section side 67 and a second section side 68 as well as a section end 69. The opposite end in relation to the section end is open. The receiving section 66 is configured to receive a bar part having similar outer geometry compared to that of the receiving section.

Figure 9E:
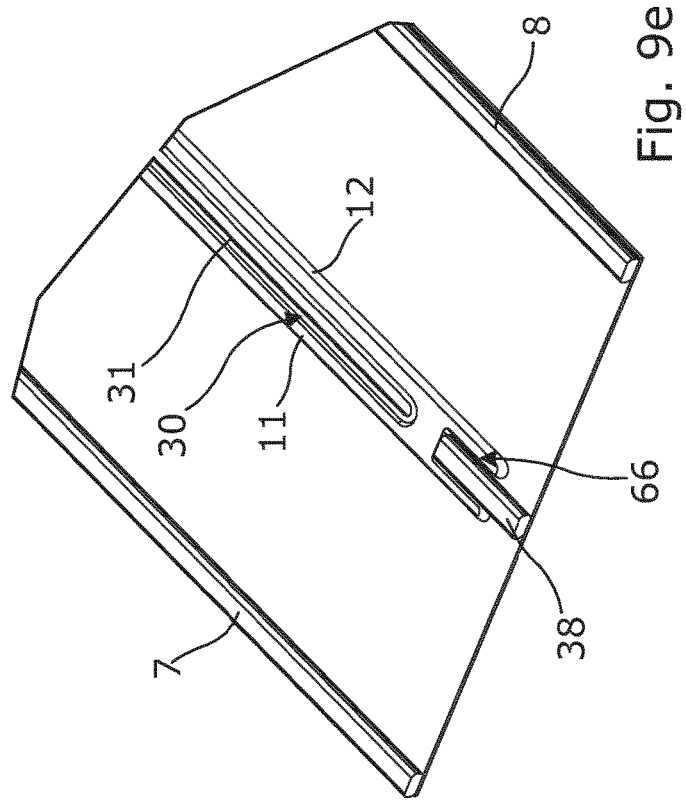
Figure 9D:
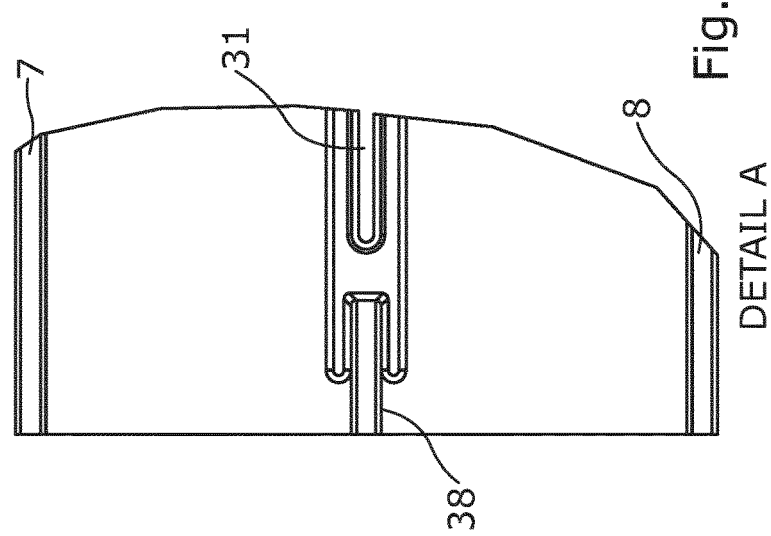
Figure 9C:
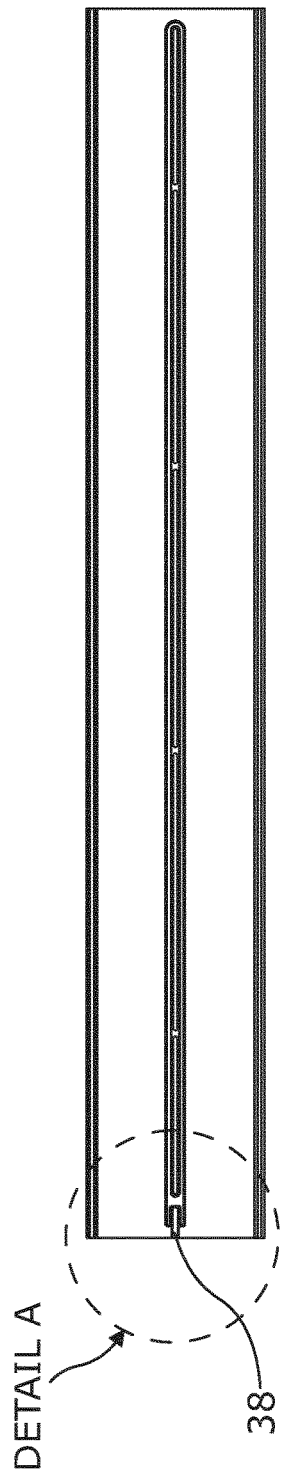

In FIG. 9*c*, the bar part 38 is arranged in the receiving section. In FIG. 9*d*, an enlarged view is shown in which the bar part 38 has been arranged in the embossed receiving section. The configuration and shapes of the receiving section and the bar part 38 facilitate sealing of this area so that leakage between the first tube section and the second tube section as well as the environment is substantially avoided, since tests have shown that soldering and sealing of the present design provide a higher degree of sealing compared to other designs.

In addition, bars have been arranged for providing the first outer wall 7 and the second outer wall 8. As further shown in FIG. 9d, the common area also comprises one or more slots 31. FIG. 9e also shows the bars arranged for providing the first outer wall 7 and the second outer wall 8 and the bar part 38 arranged in the receiving section 66.

Receiving sections may be provided by embossing in each end of the common area, however, in the present embodiment a receiving section 66 is only provided in one end. In the opposite end of this embodiment, a flow passage is provided between the first tube section and the second tube section for providing flow between the first tube section and the second tube section itself and/or by assisting the manifold in providing flow between the first tube section and the tube second section.

Although the invention has been described in the above in connection with preferred embodiments of the invention, it will be evident for a person skilled in the art that several modifications are conceivable without departing from the invention as defined by the following claims.

The invention claimed is:

1. A heat exchanger comprising: at least one fluid tube configured to extend substantially orthogonally to a wind direction, the fluid tube is made from a first sheet plate defining a first wall and a second sheet plate defining a second wall, the first and second sheet plates being separate components that are joined together, and the fluid tube comprising:
   a first tube section and a second tube section each extending along the fluid tube, arranged such that each tube section has a first longitudinal end that is connected to a first manifold and a second longitudinal end that is connected to a second manifold, and where the tube sections are in fluid communication from the first manifold in a longitudinal direction along a longitudinal axis with second manifold and configured to contain a cooling fluid,
   wherein the first tube section is formed by the first wall, the second wall, a first outer wall and a first inner wall and
   the second tube section is formed by the first wall, the second wall, a second outer wall and a second inner wall,
   the first inner wall, the second inner wall, the first outer wall and the second outer wall extending substantially parallel along the fluid tube in fluid-tight contact with the first wall and the second wall, wherein the heat exchanger is configured to lead the cooling fluid in a first direction in the first tube section and in a second direction in the second tube section, the first direction being opposite to the second direction, wherein the cooling fluid is led through the second tube section before entering the first tube section and the first tube section is arranged upstream of the second tube section in relation to the wind direction so that a cooling air flowing in the wind direction cools the cooling fluid with the lowest temperature first,
   wherein the first inner wall and the second inner wall are spaced apart by at least one common area defined by the first inner wall and the second inner wall, the first inner wall and the second inner wall being arranged at a distance (d) from each other, and the at least one common area being arranged between the first tube section and the second tube section and that the common area comprises at least one slot, and
   wherein the first and second inner walls meet at the first longitudinal end and at the opposite second longitudinal end, and wherein at least one seal is provided between an outer surface of the first inner wall and an outer surface of the second inner wall at the first longitudinal end and the second longitudinal end.

2. The heat exchanger according to claim 1, wherein the first outer wall and the second outer wall are formed by a pair of sidewalls of the fluid tube.

3. The heat exchanger according to claim 2, wherein the at least one slot is an elongated slot extending along a longitudinal axis of the fluid tube.

4. The heat exchanger according to claim 1, wherein the at least one fluid tube is a flat fluid tube.

5. The heat exchanger according to claim 1, wherein turbulators are arranged inside the tube sections.

6. The heat exchanger according to claim 5, wherein the turbulator is formed by dimples arranged on the first wall and/or on the second wall of the fluid tube.

7. The heat exchanger according to claim 1, wherein the heat exchanger comprises a plurality of fluid tubes and lamellas arranged between at least some of the said fluid tubes so as to extend through substantially the entire heat exchanger in the wind direction.

8. The heat exchanger according to claim 1, wherein the first inner wall and the second inner wall are formed by a pair of elongated bars.

9. The heat exchanger according to claim 1, wherein the first inner wall comprises a pair of first diverging sections and the second inner wall comprises a corresponding pair of second diverging sections, whereby the first diverging section extends towards the first outer wall and the second diverging section extends towards the second outer wall, whereby the first diverging sections are arranged opposite to the respective second diverging sections so as to form the common area.

10. The heat exchanger according to claim 8, wherein the first wall and/or the second wall comprise(s) at least one protruding element protruding from said first or second wall, whereby said protruding element is configured to retain the first inner wall and the second inner wall so as to form the common area.

11. The heat exchanger according to claim 1, wherein the fluid tube comprises a plurality of slots and a plurality of protruding elements along the longitudinal axis of the fluid tube, whereby the protruding elements are arranged between the slots of the first wall and/or the slots of the second wall.

12. The heat exchanger according to claim 1, wherein the fluid tube is configured to extend in a vertical direction, whereby the pair of manifolds comprises a first manifold and a second manifold.

13. The heat exchanger according to claim 1, wherein the heat exchanger is a block heat exchanger.

14. The heat exchanger according to claim 1, wherein the inner walls are interconnected by means of the common area, whereby the common area is formed by embossing the first wall and/or embossing the second wall so as to form said inner walls and the common area.

15. The heat exchanger according to claim 1, wherein the fluid tube has a first end and a second end, whereby the inner walls are joined at the ends of the fluid tube and each end extend into one of the manifolds.

16. The heat exchanger according to claim 1, wherein the first wall and the second wall span an entire width of the first and second tube sections.

17. The heat exchanger according to claim 1, each of the first wall and the second wall comprise a single homogeneous piece of material that spans the first and second tube sections.

18. The heat exchanger according to claim 1, wherein the first and second walls are parallel to one another along the entire width of the first and second tube sections.

19. The heat exchanger according to claim 1, wherein the first and second walls span the entire width of the first and second tube sections, and wherein the first and second walls abut one another in a central portion of the fluid tube to form the first and second inner walls, the first and second walls being spaced apart from one another, with the exception of the central portion, to allow fluid passage.

20. The heat exchanger according to claim 1, wherein the at least one seal comprises an adhesive, a paste, or a gasket.

21. The heat exchanger according to claim 1, wherein the at least one seal comprises a first seal between the first and second inner walls at the first end portion and a second seal between the first and second inner walls at the second end portion.

22. A wind turbine comprising a heat exchanger according to claim 1.

* * * * *